United States Patent
Hancock (12) 
(10) Patent No.: US 12,127,696 B2
(45) Date of Patent: Oct. 29, 2024

(54) WALL HANGING AND SECURING DEVICE AND METHOD OF USE

(71) Applicant: Bloomd, LLC, Salina, KS (US)

(72) Inventor: Heath Hancock, Salina, KS (US)

( * ) Notice: Subject to any disclaimer, the term of this patent is extended or adjusted under 35 U.S.C. 154(b) by 0 days.

(21) Appl. No.: 18/119,530

(22) Filed: Mar. 9, 2023

(65) Prior Publication Data

US 2023/0284800 A1  Sep. 14, 2023

Related U.S. Application Data (60) Provisional application No. 63/318,131, filed on Mar. 9, 2022.

(51) Int. Cl.
| | |
|---|---|
| A47B 97/00 | (2006.01) |
| A47G 1/16 | (2006.01) |
| F16B 13/08 | (2006.01) |
| B65D 63/10 | (2006.01) |
| H02G 3/32 | (2006.01) |

(52) U.S. Cl.
CPC .......... *A47G 1/1633* (2013.01); *A47B 97/00* (2013.01); *A47B 2097/008* (2013.01); *B65D 63/1027* (2013.01); *H02G 3/32* (2013.01)

(58) Field of Classification Search
CPC ............ A47G 1/1633; A47B 97/00; A47B 2097/008; F16B 13/0808; B65D 63/1027; F16L 3/2332; H02G 3/32
USPC ...................................................... 248/475.1
See application file for complete search history.

(56) References Cited

U.S. PATENT DOCUMENTS

| | | | | |
|---|---|---|---|---|
| 4,286,497 A | * | 9/1981 | Shamah | F16B 13/0808 411/345 |
| 4,435,881 A | * | 3/1984 | Yamaguchi | F16L 3/127 24/16 PB |
| 4,602,760 A | * | 7/1986 | Tiefenbach | F16B 19/1081 411/908 |
| 4,865,501 A | * | 9/1989 | Ferris | F16B 13/0808 24/453 |
| 5,601,261 A | * | 2/1997 | Koike | H02G 3/26 D8/382 |
| 5,675,942 A | * | 10/1997 | Crawford | E04F 21/18 52/509 |
| 6,220,562 B1 | * | 4/2001 | Konkle | A47B 97/00 248/500 |
| 6,347,435 B1 | * | 2/2002 | Davignon | B65D 63/1063 411/338 |
| 7,001,126 B2 | * | 2/2006 | Lesecq | F16B 19/1054 411/340 |
| 8,079,199 B1 | * | 12/2011 | Kufner | E04F 15/02022 52/749.11 |
| 8,122,532 B2 | * | 2/2012 | Kramer | E03C 1/322 4/654 |

(Continued)

*Primary Examiner* — Nkeisha Smith
(74) *Attorney, Agent, or Firm* — Law Office of Mark Brown, LLC; Christopher M DeBacker (57) ABSTRACT

An anchor system which can be used to hang framed items from a wall or to secure and anchor a piece of furniture or other object to a wall. The system includes an arrow element, a first washer element, and a second washer element. The arrow element includes a head with several expanding barbs and a body which includes a zip-tie zipper portion. Each washer has a flat body with a front face and a rear face, and a zip-tie receiver portion at its center on its front face, and with several prongs on its rear face opposing the receiver portion.

6 Claims, 10 Drawing Sheets

(56) References Cited

U.S. PATENT DOCUMENTS

| | | | |
|---|---|---|---|
| 8,510,918 B2* | 8/2013 | Shilale | B65D 63/1072 |
| | | | 24/16 PB |
| 9,212,677 B2* | 12/2015 | Owen | F16B 13/0808 |
| 9,228,363 B2* | 1/2016 | Kufner | E04F 21/0092 |
| 9,533,808 B2* | 1/2017 | Berglund | F16L 3/233 |
| 9,541,112 B1* | 1/2017 | Weston | F16B 13/0808 |
| 9,802,743 B2* | 10/2017 | Foreman | F16L 3/222 |
| 9,844,971 B2* | 12/2017 | Reda | B42F 13/06 |
| 11,002,383 B2* | 5/2021 | Naugler | F16B 2/243 |
| 11,732,741 B2* | 8/2023 | Connors | F16B 13/0808 |
| | | | 411/337 |
| 2017/0261155 A1* | 9/2017 | Kilim | F16M 13/02 |
| 2023/0036772 A1* | 2/2023 | Lu | A47B 47/0075 |

* cited by examiner

WALL HANGING AND SECURING DEVICE AND METHOD OF USE

CROSS-REFERENCE TO RELATED APPLICATION

This application claims priority in U.S. Provisional Patent Application No. 63/318,131 Filed Mar. 9, 2022, which is incorporated herein by reference.

BACKGROUND OF THE INVENTION

1. Field of the Invention

The present invention relates generally to a wall hanger and method for use thereof, and more specifically to a wall hanging device which can anchor furniture and hang pictures and other framed items.

2. Description of the Related Art

Heavy furniture, tall chests, mirrors, and other items can be dangerous to small children who may attempt to climb or hang on them. Heavy furniture can tip and fall onto a child, injuring them. Zip ties and wall anchors have been used to help prevent tipping of furniture, however these usually require the use of several tools to drive an anchor into a wall and then affix a zip-tie around the anchor. These anchors are also generally unsightly and they are difficult to disguise. What is needed is a simple, single-action anchoring device for securing furniture and allowing frames to be hung from.

Heretofore there has not been available a system or method for a wall hanging and securing device with the advantages and features of the present invention.

BRIEF SUMMARY OF THE INVENTION

The present invention generally provides an anchor system which can be used to hang framed items from a wall or to secure and anchor a piece of furniture or other object to a wall. The system includes an arrow element, a first washer element, and a second washer element. The arrow element includes a head with several expanding barbs and a body which includes a zip-tie zipper portion. Each washer has a flat body with a front face and a rear face, and a zip-tie receiver portion at its center on its front face, and with several prongs on its rear face opposing the receiver portion.

The user will drill a hole into the wall with an appropriately sized bit (e.g. ⅜th inch drill bit). The arrow head is inserted into the hole and the barbs expand on the back-side of the wall. The washer is then inserted onto the body of the arrow, thereby securing the zip-tie zipper portion about the zip-tie receiver portion. The rear face of the first washer is oriented about the hole and the four progs are inserted into the hole, and pulling against the arrow then tightens the barbs flat against the back side of the wall, while ensuring the first washer is flush against the front side of the wall.

A similar shaped hole is also drilled into the furniture, and the rear end of the arrow body is fed through the hole. The second washer is similarly secured to the arrow body via the zip-tie receiver and zip-tie zipper within the interior of the furniture. When the furniture is placed against the wall, the second washer can be pushed towards the rear of the furniture interior until the furniture is in its desired location.

Each washer also includes a release clasp which can be pushed using a screwdriver or other tool, thereby releasing the zipper from the receiver, allowing the washer to be removed from the arrow.

Each washer also contains a double lip with a dip between which can be used to hang frames from a wall using wire hangers.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Wall Securing and Hanging System 2

Figure 1:
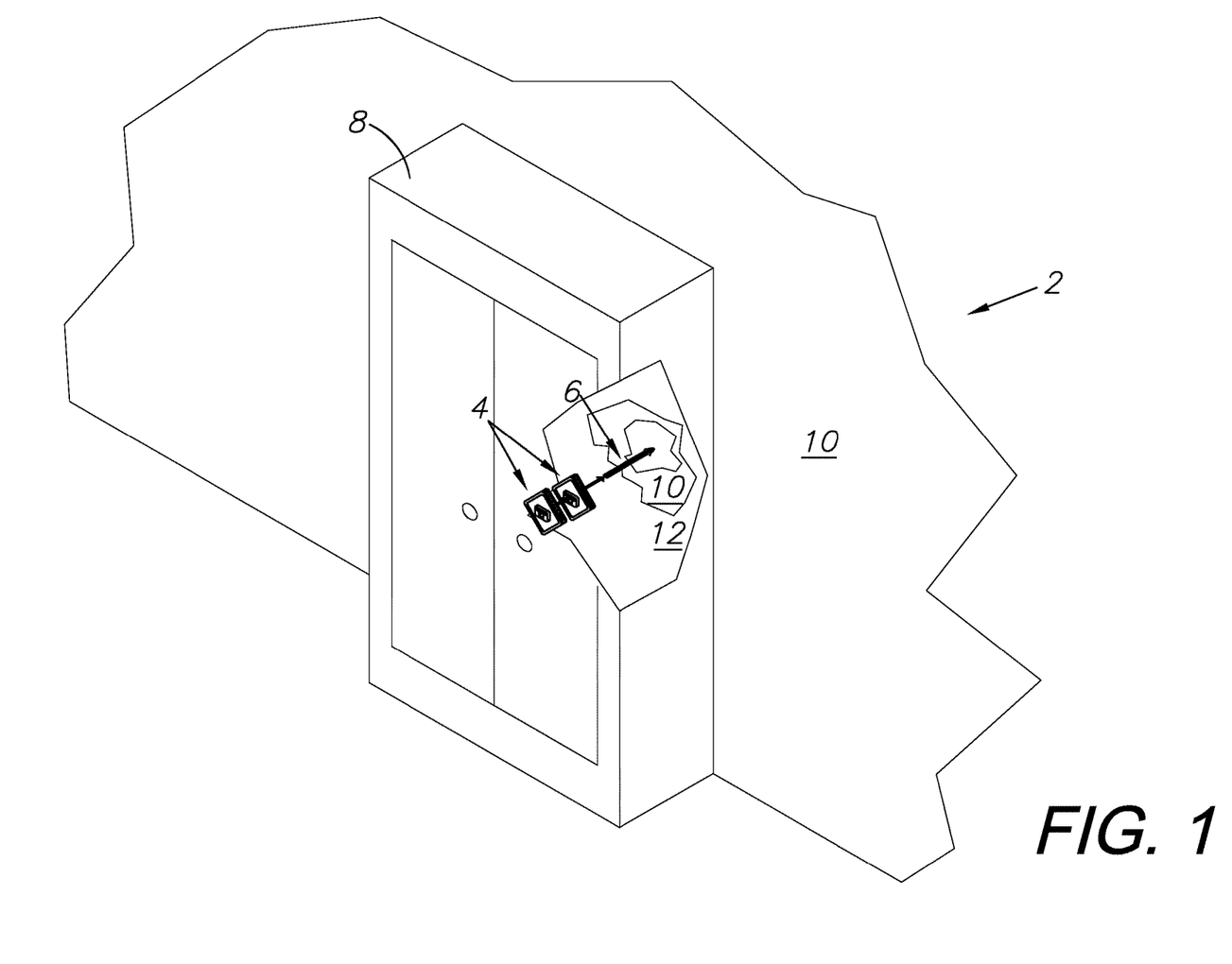
FIG. 1 is a three-dimensional isometric view of a preferred embodiment of the present invention shown in a typical environment securing a furniture piece to a wall.
Figure 2:
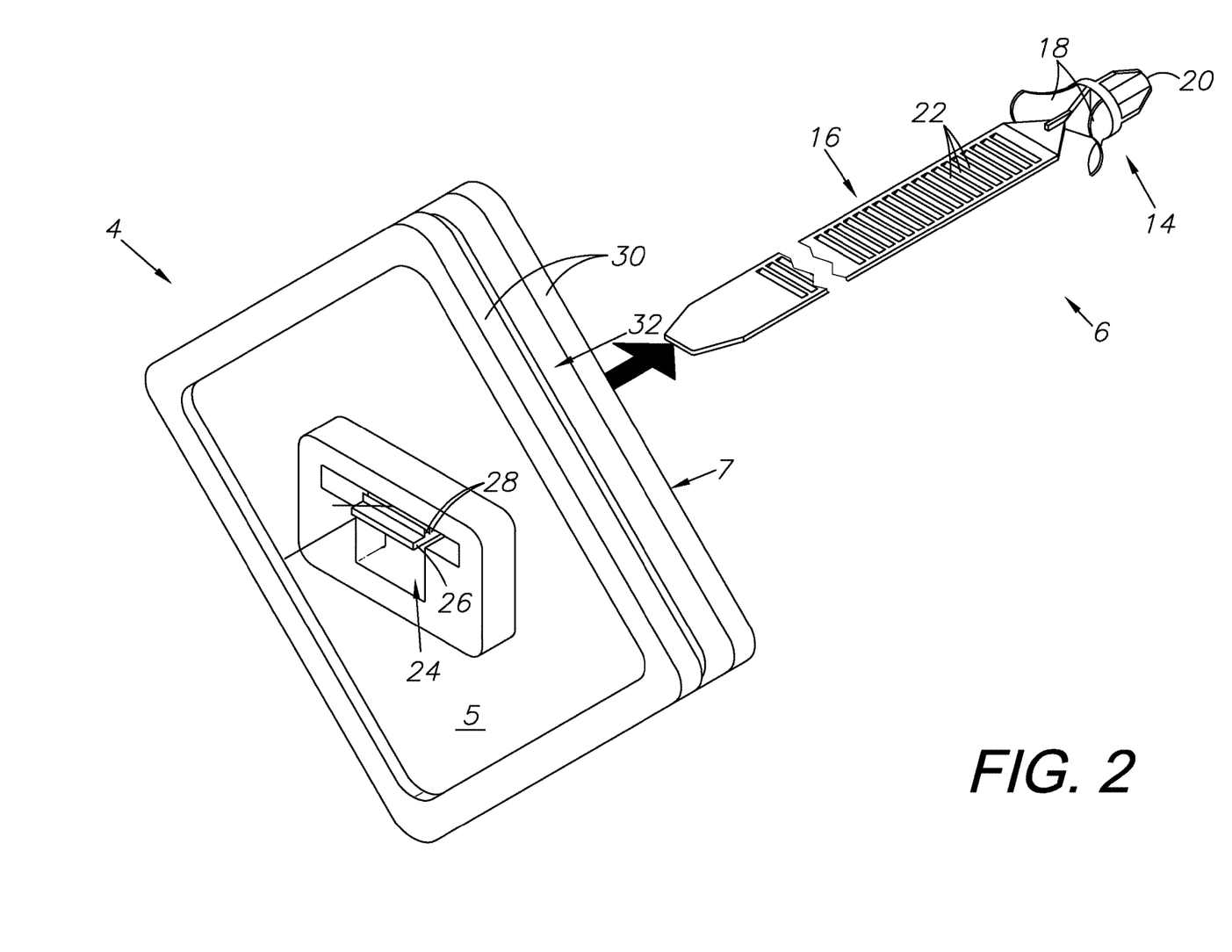
FIG. 2 is a three-dimensional isometric view of an arrow-tie element and a washer element of the present invention.
Figure 10:
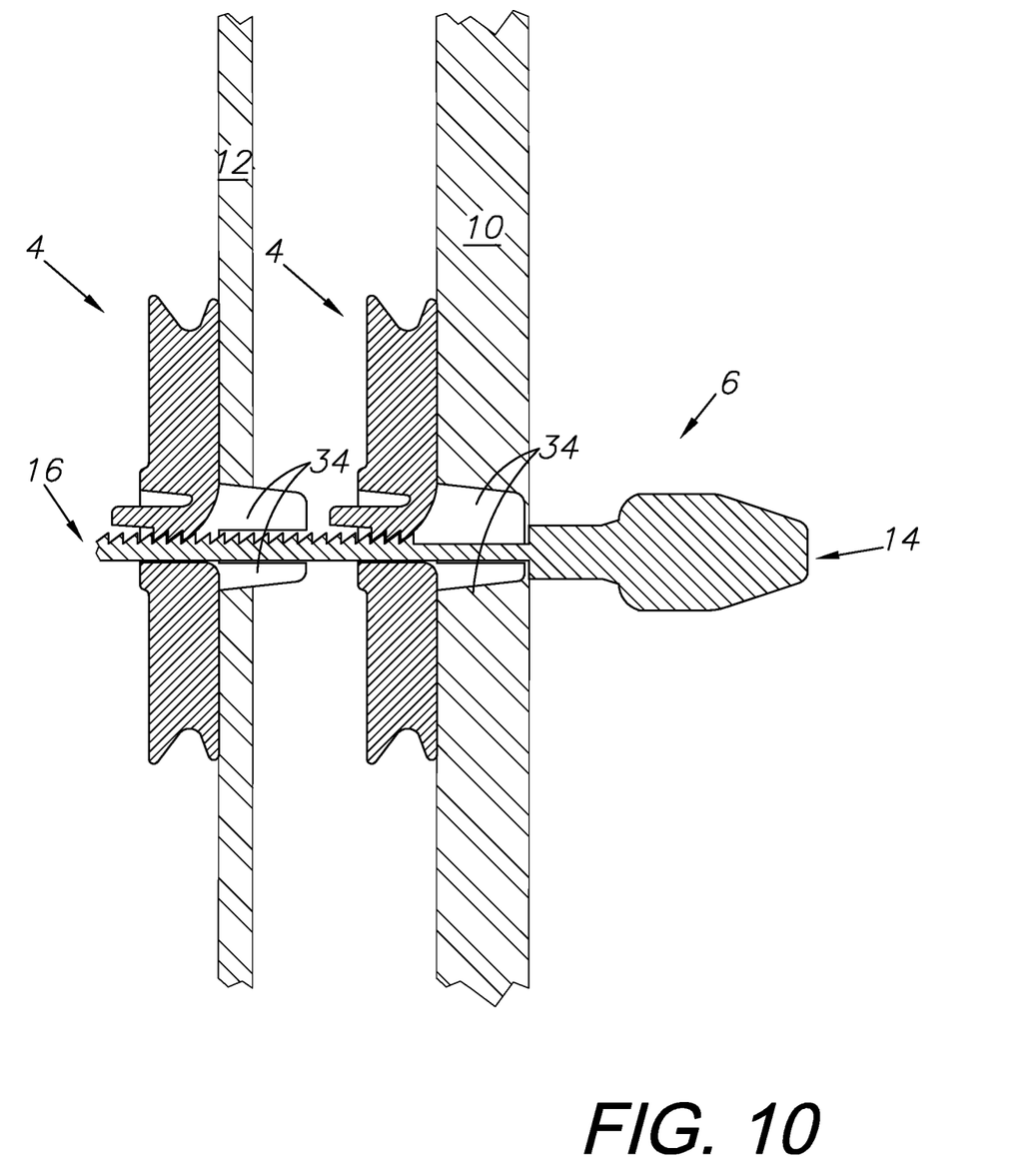
FIG. 10 is a side sectional view showing the interfacing of the arrow-tie element with two washers, a furniture piece, and a wall.

As shown in FIGS. 1-10, the present invention is a wall securing and hanging system 2 including a washer element 4 and an arrow-tie element 6. As shown in FIGS. 1 and 10, a second washer element 4 could also be deployed within a piece of furniture 8, attached to the back wall 12 thereof, to secure the furniture to a wall 10. The arrow-tie element 6 has an arrow head 14 with barbs 18 and a tip 20. When inserted through a predrilled hole, the barbs 18 will feather out and prevent the arrow head from being pulled back through the hole. The arrow-tie body 16, which is formed from a zip-tie, extends out from the hole once the head is inserted therein.

The washer has a front face 5 which includes a zip-tie receiver 24, and a rear face 7 which includes four prongs 34. The receiver has a latch 26 which has several teeth 28 designed to interface with the teeth 22 of the arrow-tie body 16. When interfaced with the arrow-tie, the arrow-tie body 16 passes through the rear opening of the washer 4 and through the receiver 24, locking the washer 4 onto the arrow-tie. As the washer is pressed to the wall, the four prongs will be inserted into the wall, placing the back face 7 of the washer flush against the front face of the wall 10.

The arrow-tie body 16 can be inserted into a pre-drilled hole into a piece of furniture 8. From there, a second washer 4, identical to the first, can be inserted over the end of the arrow-tie body 16 and used to secure the furniture to the wall by pressing the second washer 4 against the back wall 12 of the furniture 8.

Figure 3:
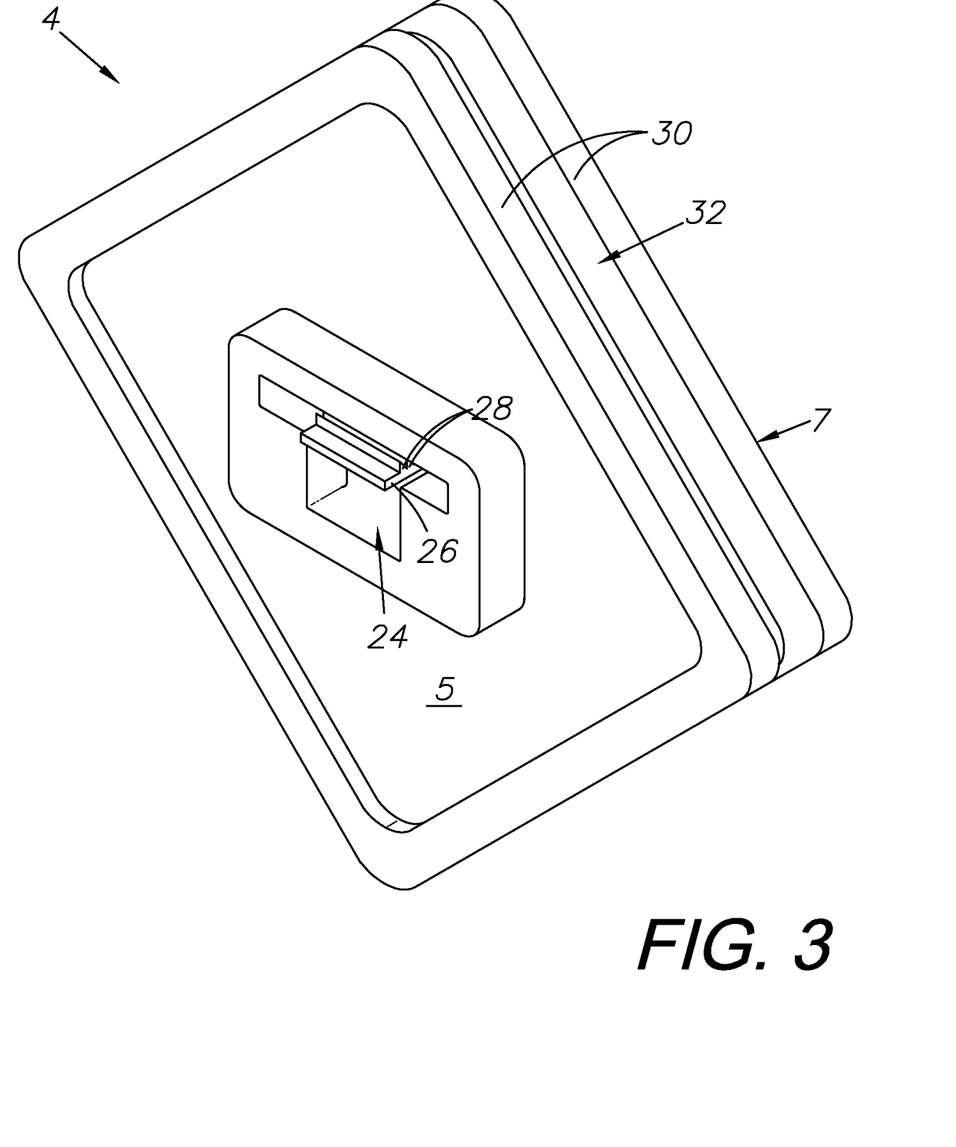
FIG. 3 is a three-dimensional isometric view of the washer element thereof from a front face.
Figure 4:
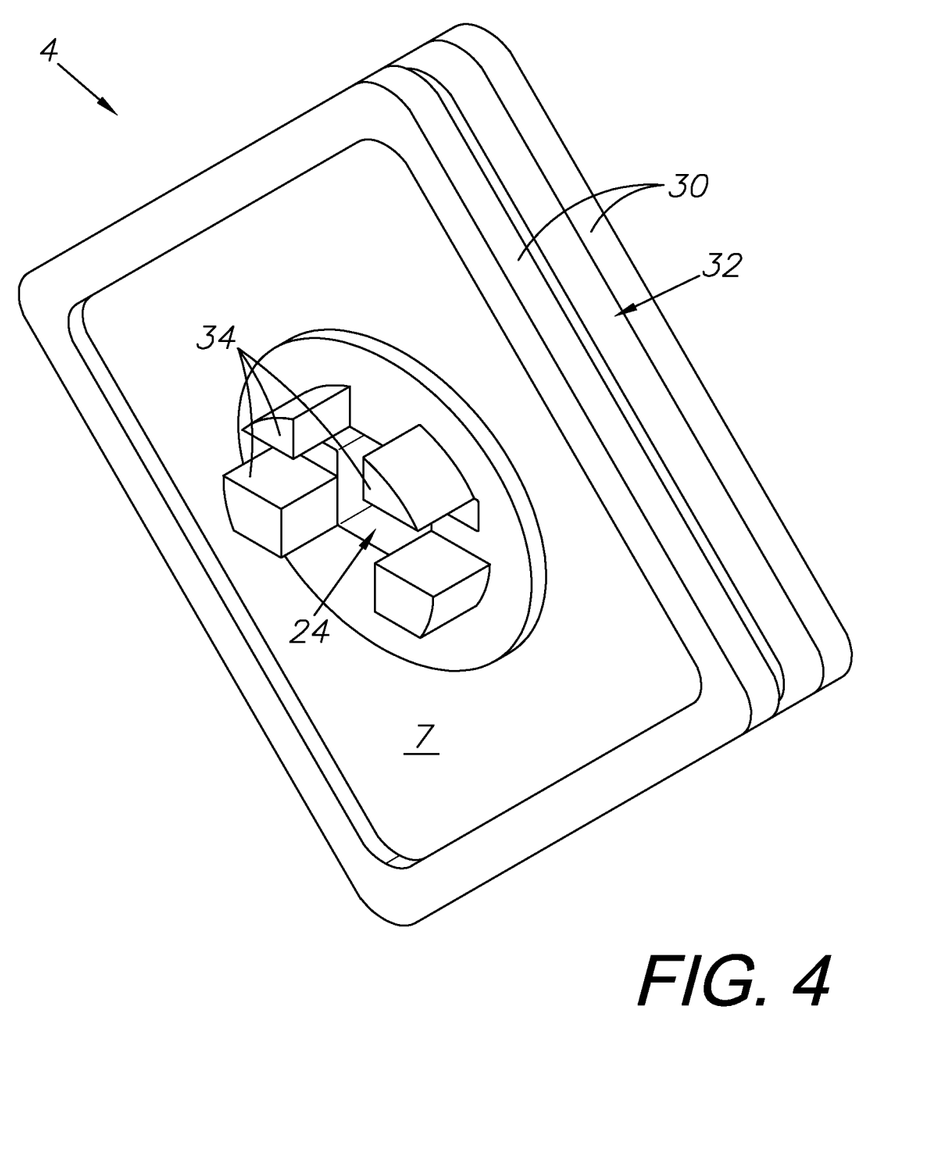
FIG. 4 is a three-dimensional isometric view of the washer element thereof from a rear face.
Figure 5:
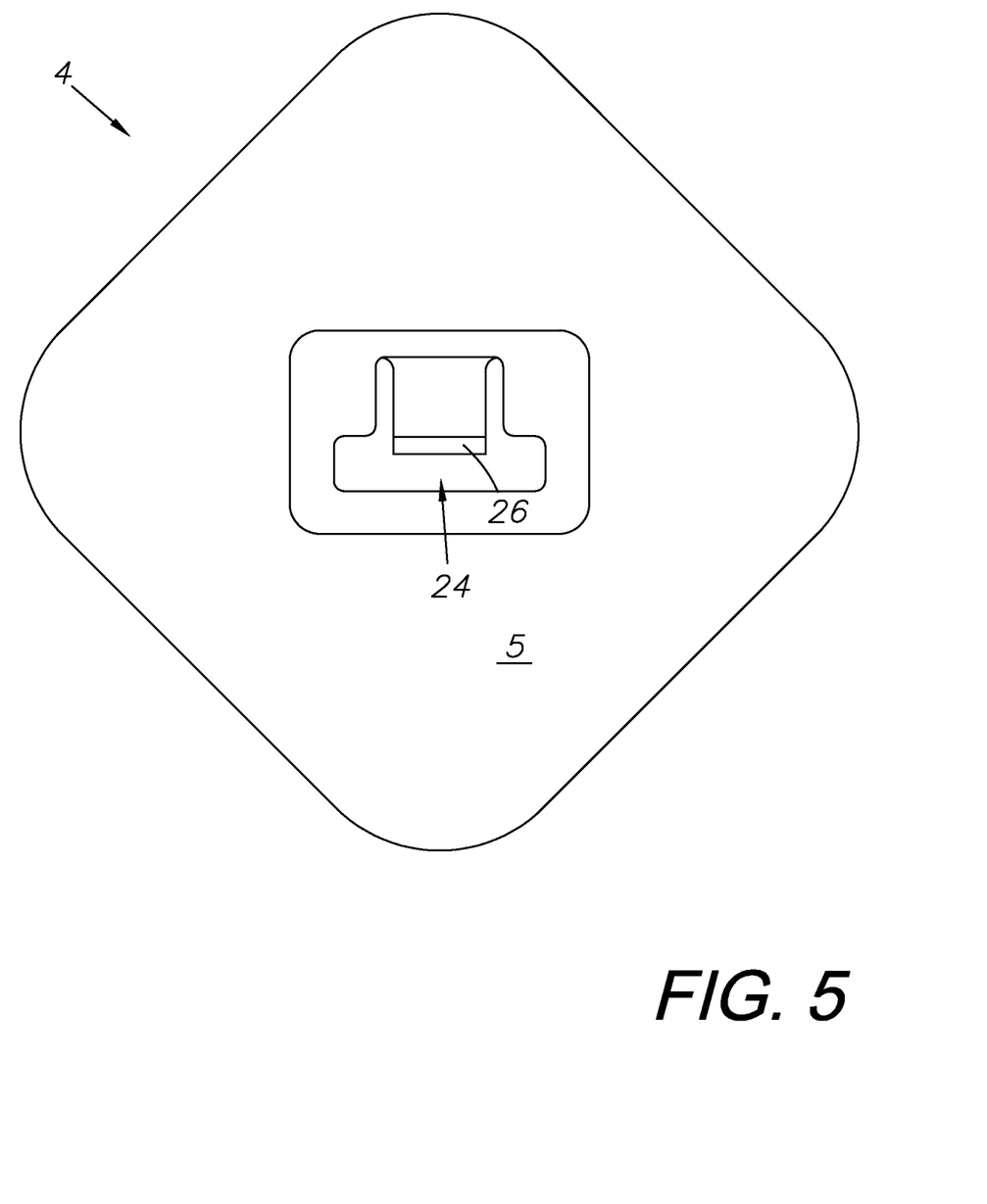
FIG. 5 is a front elevational view thereof.
Figure 6:
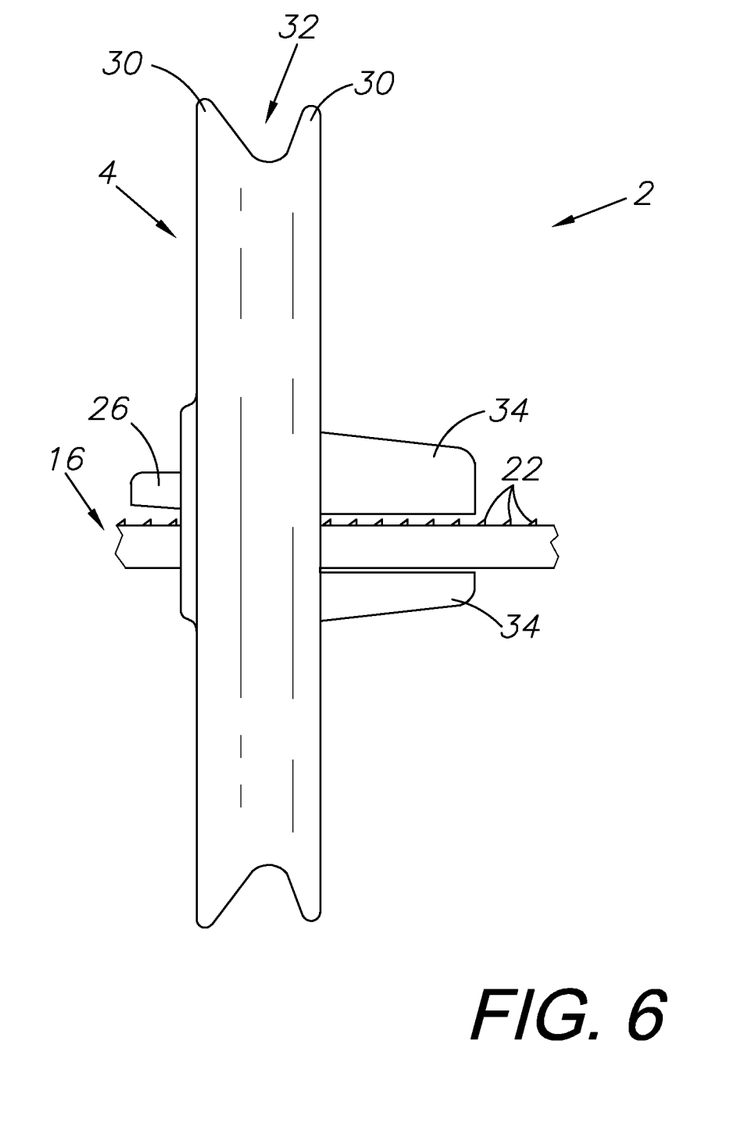
FIG. 6 is a side elevational view thereof, shown interfacing with a zip-tie portion of the arrow-tie element.
Figure 7:
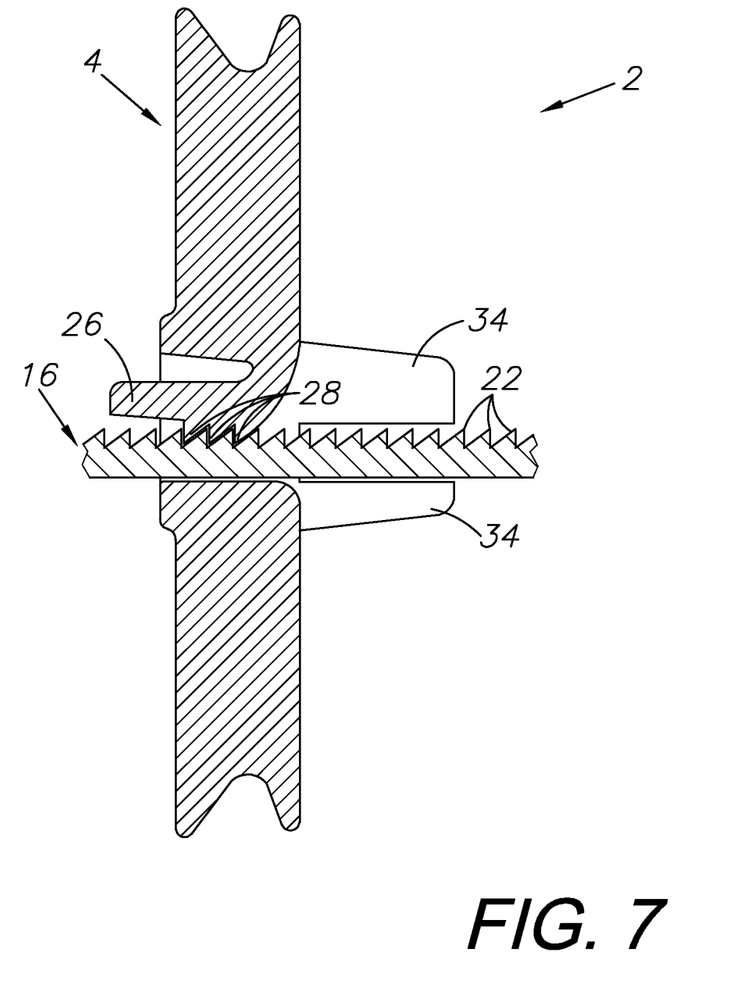
FIG. 7 is a side sectional view thereof.
Figure 8:
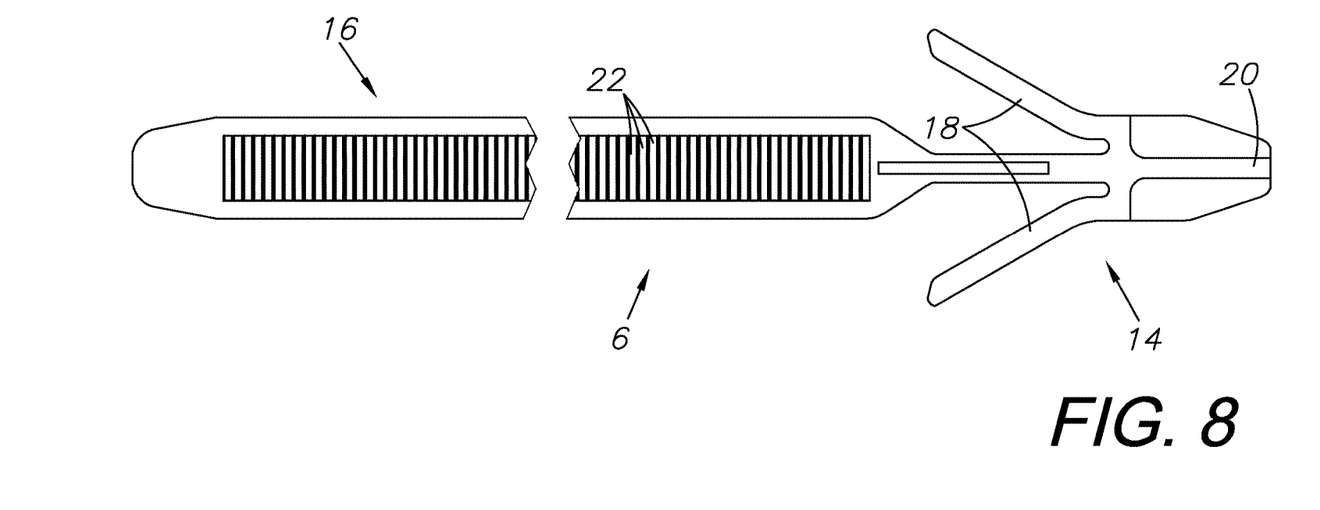
FIG. 8 is a top plan view of the arrow-tie element.
Figure 9:
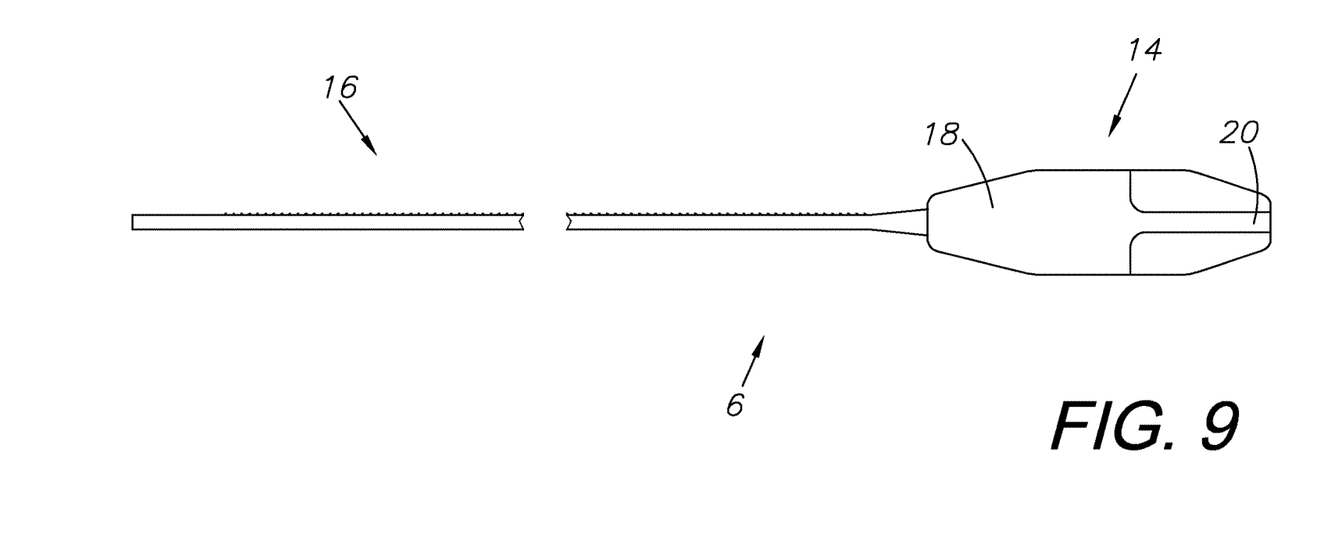
FIG. 9 is a side elevational view thereof.

The washer includes a pair of lips 30 forming a channel 32 around the exterior of the washer. This can be used to hang items, such as frames, from the washer 4 using a wire or other suitable hanging element. This would require only one washer 4, with the arrow-tie 6 securing the single washer 4 flush against the wall 10, upon which frames or other items can be hung.

Figure 11:
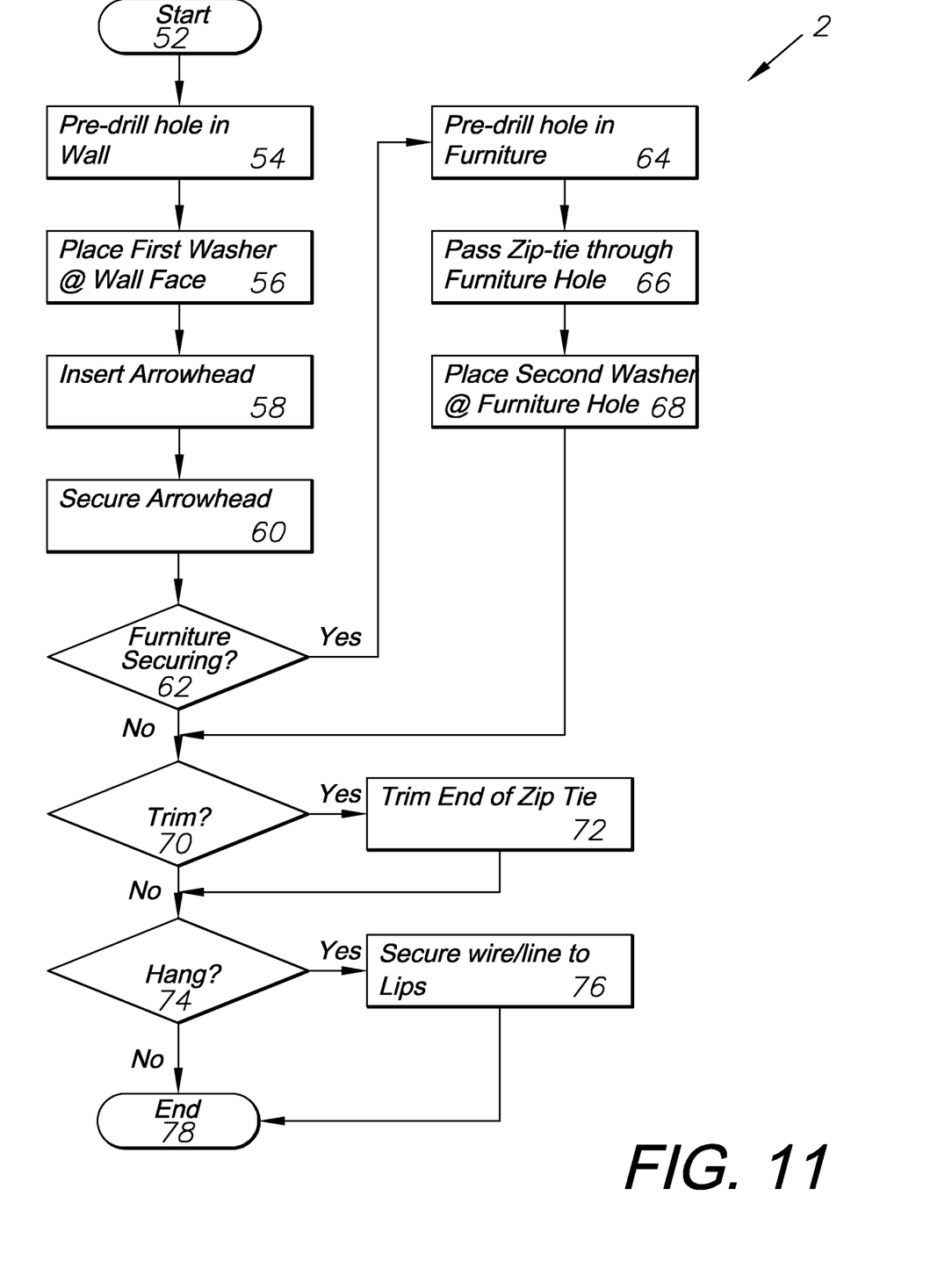
FIG. 11 is a flowchart diagramming the steps taken in practicing an embodiment of the present invention.

FIG. 11 shows a method of practicing the wall securing and hanging system 2, which begins at 52. A hole is pre-drilled into a wall at 54. The first washer, which may be the only washer, is inserted into the hole via the prongs 34 at 56. The arrowhead 14 of the arrow-tie 6 is then inserted through the receiver 14 of the washer 4 at 58, securing it to the wall 10. The arrow-tie is then tugged to secure the barbs 18 to the rear of the wall 10 at 60.

If furniture is to be secured to the wall at 62, a second hole is predrilled into the furniture item at 64. The zip-tie body 16 of the arrow-tie 6 is then pushed through the furniture hole at 66, and a second washer is placed over the arrow-tie body 16 at 68, thereby securing the furniture directly to the wall via the arrow-tie 6 and the two washers 4.

If the end of the zip-tie body 16 of the arrow-tie 6 needs to be trimmed at 70, the end can be cut with scissors or other tools at 72.

If an object is to be hung from one or more of the washers 4 at 74, then the object can be secured via using a wire, line, or other suitable element to hang the object between the lips at 76. The process ends at 78 with secured items.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A securing system for securing a furniture item to a wall surface, the securing system comprising:
   a washer comprising a front face having a zip-tie receiver, and a rear face having a plurality of prongs;
   an arrow comprising an arrow head having a plurality of barbs and an arrow body comprising a zip-tie zipper;
   said arrow head configured to be inserted into a pre-drilled wall hole into a wall such that said plurality of barbs prevent said arrow head from being pulled out of said pre-drilled wall hole;
   said zip-tie receiver configured to be connected to said zip-tie zipper of said arrow body;
   said washer configured to be placed within an interior of a furniture item having a pre-drilled furniture hole;
   said arrow body configured to be inserted through said pre-drilled furniture hole;
   wherein said washer is configured to engage said arrow about said zip-tie receiver; and
   wherein said plurality of prongs of said washer are configured to be inserted into said pre-drilled furniture and wall holes, such that said furniture item is secured to said wall between said washer and said arrow head.

2. The system of claim 1, wherein said zip-tie zipper of said arrow body comprising zip-tie teeth on only one face of said arrow body.

3. The system of claim 1, further comprising:
   said washer having a pair of lips around an edge located between said front face and said rear face;
   a relief formed between said pair of lips; and
   said relief configured to hang an item from a wire.

4. A method of securing an object, the method comprising the steps:
   providing a washer comprising a front face having a zip-tie receiver, and a rear face having a plurality of prongs;
   providing an arrow comprising an arrow head having a plurality of barbs and an arrow body comprising a zip-tie zipper;
   inserting said arrow head into a pre-drilled wall hole into a wall such that said plurality of barbs prevent said arrow head from being pulled out of said pre-drilled wall hole;
   placing said arrow body through a pre-drilled furniture hole of a furniture item;
   positioning said washer within said furniture item;
   engaging said arrow body with said washer via said zip-tie zipper and said zip-tie receiver and inserting said plurality of prongs of said washer into said pre-drilled furniture and wall holes; and
   securing said furniture item to said wall between said washer and said arrow head.

5. The method of claim 4, further comprising the steps:
   providing a pair of lips around an edge located between said front face and said rear face of said washer;
   forming a relief between said pair of lips; and
   hanging the object from a wire and securing said wire within said relief.

6. A securing system for securing a furniture item to a wall surface, the securing system comprising:
   a first washer comprising a front face having a zip-tie receiver, and a rear face having a plurality of prongs;
   an arrow comprising an arrow head having a plurality of barbs and an arrow body comprising a zip-tie zipper;
   said arrow head configured to be inserted into a pre-drilled wall hole into a wall such that said plurality of barbs prevent said arrow head from being pulled out of said pre-drilled wall hole;
   said zip-tie receiver configured to be connected to said zip-tie zipper of said arrow body;
   a second washer comprising a front face having a zip-tie receiver, and a rear face having a plurality of prongs;
   said second washer configured to be placed within an interior of a furniture item having a pre-drilled furniture hole; and
   wherein said first washer is configured to engage said arrow about said zip-tie receiver and said plurality of prongs of said first washer are configured to be inserted into said pre-drilled wall hole.

\* \* \* \* \*